United States Patent
Sava et al.

(10) Patent No.: US 12,490,141 B2
(45) Date of Patent: Dec. 2, 2025

(54) SYSTEM AND METHOD FOR WIRELESS NETWORK CAPACITY ENHANCEMENTS FOR XR JITTER SENSITIVITY APPLICATIONS

(71) Applicant: T-MOBILE INNOVATIONS LLC, Overland Park, KS (US)

(72) Inventors: Herkole Sava, Centreville, VA (US); Ankit Arvind Muchhala, Leesburg, VA (US); Michael Scott Witherell, Portland, OR (US); Zheng Fang, McLean, VA (US); Shu Wang, Portland, OR (US)

(73) Assignee: T-Mobile Innovations LLC, Overland Park, KS (US)

( * ) Notice: Subject to any disclaimer, the term of this patent is extended or adjusted under 35 U.S.C. 154(b) by 368 days.

(21) Appl. No.: 18/120,293

(22) Filed: Mar. 10, 2023

(65) Prior Publication Data
US 2024/0306030 A1    Sep. 12, 2024

(51) Int. Cl.
*H04W 28/02* (2009.01)
*H04B 7/06* (2006.01)
*H04L 43/106* (2022.01)
*H04W 80/02* (2009.01)

(52) U.S. Cl.
CPC ...... *H04W 28/0268* (2013.01); *H04B 7/0632* (2013.01); *H04L 43/106* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 2010/0142447 A1* | 6/2010 | Schlicht | H04W 4/20 370/328 |
| 2023/0137968 A1* | 5/2023 | Stockhammer | H04W 28/0268 370/235 |
| 2023/0198663 A1* | 6/2023 | Stoica | H04L 1/0041 714/726 |
| 2024/0205913 A1* | 6/2024 | Esswie | H04W 72/1263 |
| 2025/0039098 A1* | 1/2025 | Salah | H04L 65/1059 |

FOREIGN PATENT DOCUMENTS

WO    WO-2023017040 A1 *    2/2023    .......... H04W 72/115

* cited by examiner

*Primary Examiner* — Anh Vu H Ly
(74) *Attorney, Agent, or Firm* — SHOOK, HARDY & BACON L.L.P.; Elena McFarland

(57) ABSTRACT

Methods and systems provide network capacity enhancement. In one embodiment, the method includes identifying delay requirements for an extended reality (XR) service application. The method further includes predicting, in the PDCP layer, one or more of jitter or latency for a data packet and dropping the data packet if the predicted jitter and/or latency is higher than the delay requirements identified for the XR service application. The method further includes predicting, in the MAC layer, jitter or the latency for the data packet and dropping the data packet if the predicted jitter or the latency in the MAC layer higher than the delay requirements identified for the XR service application and preparing the data packet for transmission through a network if the one or more of the jitter or latency in the MAC layer for the data packet is less than the delay requirements identified for the XR service application.

20 Claims, 7 Drawing Sheets

SYSTEM AND METHOD FOR WIRELESS NETWORK CAPACITY ENHANCEMENTS FOR XR JITTER SENSITIVITY APPLICATIONS

BACKGROUND

Certain applications such as Extended Reality (XR) applications demand high throughput since they are computer-generated environments that either merge physical and virtual environments or create an entirely virtual experience for users. XR application can include any immersive technology that enables extension of reality while blending virtual graphics with the real world, such as Virtual Reality (VR), Augmented Reality (AR), Mixed Reality (MR), and any other immersive technologies. Virtual Reality (VR) applications generate 3D environments that allow users to immerse in simulated realities and engage the user's five senses in the virtual world. In Augmented Reality (AR) applications, images are overlaid onto the real world, such as filters for images or the like. Mixed Reality (MR) blends real and virtual worlds in complex environments where physical and digital elements interact in real time. In some cases, to provide a higher Quality of Service for XR users, XR applications have network requirements that are high in throughput and low in latency, especially highly interactive XR applications. For example, some XR applications discard data packets that are received outside of a given timeframe, leading to a waste of network resources which otherwise could be used for other users or applications. As such, optimally utilizing network resources is important for applications such as the XR application.

SUMMARY

Embodiments of the present disclosure related to, among other things, a system and method to transmit data through existing communication protocols. In particular, embodiments described herein identify delay requirements for an Extended Reality (XR) service application. In the Packet Data Convergence Protocol (PDCP) layer, the PDCP-layer predicted jitter and/or latency for a data packet is determined. In the PDCP layer, it is determined whether the PDCP-layer predicted jitter and/or latency for the data packet is less than the identified delay requirements for the service application. The data packet is dropped when the PDCP-layer predicted jitter and/or latency for the data packet is not less than the identified delay requirements for the service application.

In the Media Access Control (MAC) layer, the MAC-layer predicted jitter and/or latency for the data packet when the PDCP-layer predicted jitter and/or latency for the data packet is less than the identified delay requirements for the service application is determined. It is determined whether the MAC-layer predicted jitter and/or latency for the data packet is less than the identified delay requirements for the service application. The data packet is dropped when the MAC-layer predicted jitter and/or latency for the data packet is not less than the identified delay requirements for the service application.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
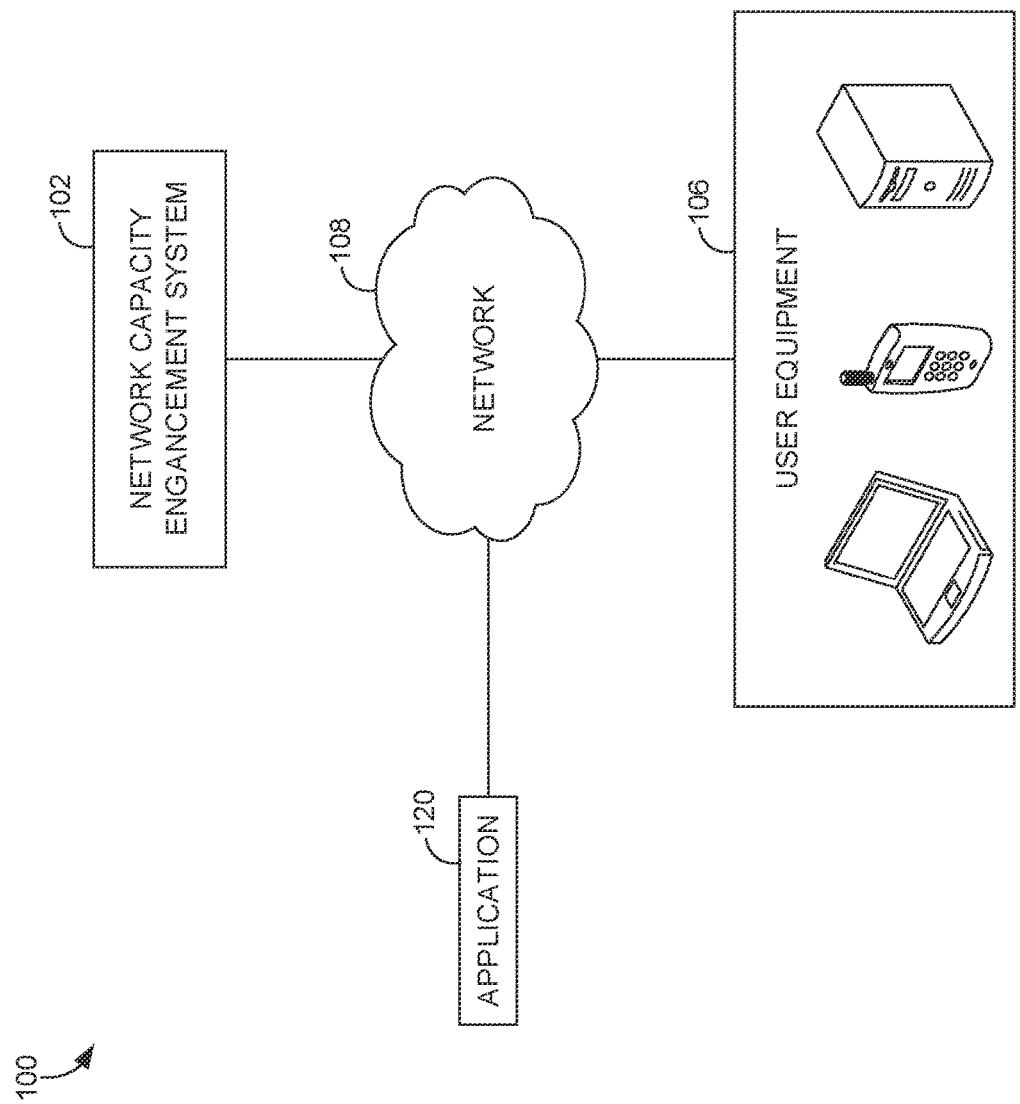
FIG. 1 is a diagram of an environment that can be used to perform the network capacity enhancement method, according to embodiments of the present disclosure.

Devices and systems that provide interactive environments are becoming embedded in everyday applications in residential and commercial settings. Applications such as immersive technologies such as XR applications are requiring networks that can provide time-critical communication capabilities and processing-intensive systems in order to provide a seamless interactive experience to the user. Time-critical services such as XR applications place much more stringent requirements on network communications. For example, delays in the network could delay consecutive updates to the environment presented to the user and could mean that there will be a delay in changing the visual environment presented to a user. Humans are more sensitive to discrepancies in immersive virtual environments. For example, a latency greater than 20 ms can cause nausea when a user is immersed in a virtual environment. For example, a slight delay between data can cause cyber sickness for users immersed in an XR experience.

Delays can be caused by latency or jitter. Latency refers to the time delay between user's acting and when the action is visible to the user. As such, latency can be referred to as the time measurement difference between sending a data packet and receiving the data packet. Jitter refers to inter-packet delay variance. In one example, jitter is referred to as variation in time of the transmission of data from a source to the destination. For example, wireless transmission medium is not always clean, and hence there are mechanisms like Hybrid Automatic Repeat Request (HARQ) to recover lost and/or corrupt pieces of information. This involves on-demand retransmission of missing information (code blocks) and reconstruction of the correct received information. It avoids retransmission of full Protocol Data Units (PDUs) by upper layers, however, this retransmission still causes delay in recovering data, thus adding to jitter. A PDU is a single unit of information transmitted among peer entities of a computer network. For example, when multiple packets are sent consecutively from source to destination, and if the network is behaving ideally, the destination can receive them without any delay (for example, 20 milliseconds, or ms). However, if there are delays in the network (for example, due to queuing, arriving through alternate routes, etc.), the arrival delay between packets can be greater than 20 ms (for example, the packets can arrive at 22 ms—causing a 2 ms positive jitter value). For applications such as immersive technologies, they are sensitive to delay and therefore a positive jitter is undesirable while a jitter value of 0 is ideal. With all the additional delay and/or jitter from these various sources in a wireless network, there is a possibility that the application may discard the received packet since it may fall outside of jitter tolerance window. For example, some end-user XR applications discard packets that are received outside of a given timeframe. Packets discarded by the application are a waste of wireless network resources that otherwise could be used for other users or applications.

Most XR applications pose very high network throughput requirements. For example, Table 1 illustrates high-level single user throughput requirements over the network across different XR use case categories:

TABLE 1

| Use Case Category | DL (Mbps) |
|---|---|
| Streaming VR | 30-100 |
| VR Gaming/Sports | 30-100 |
| VR Conference | 50 |
| AR/MR: Educational/Industrial | 60 |

Figure 5:
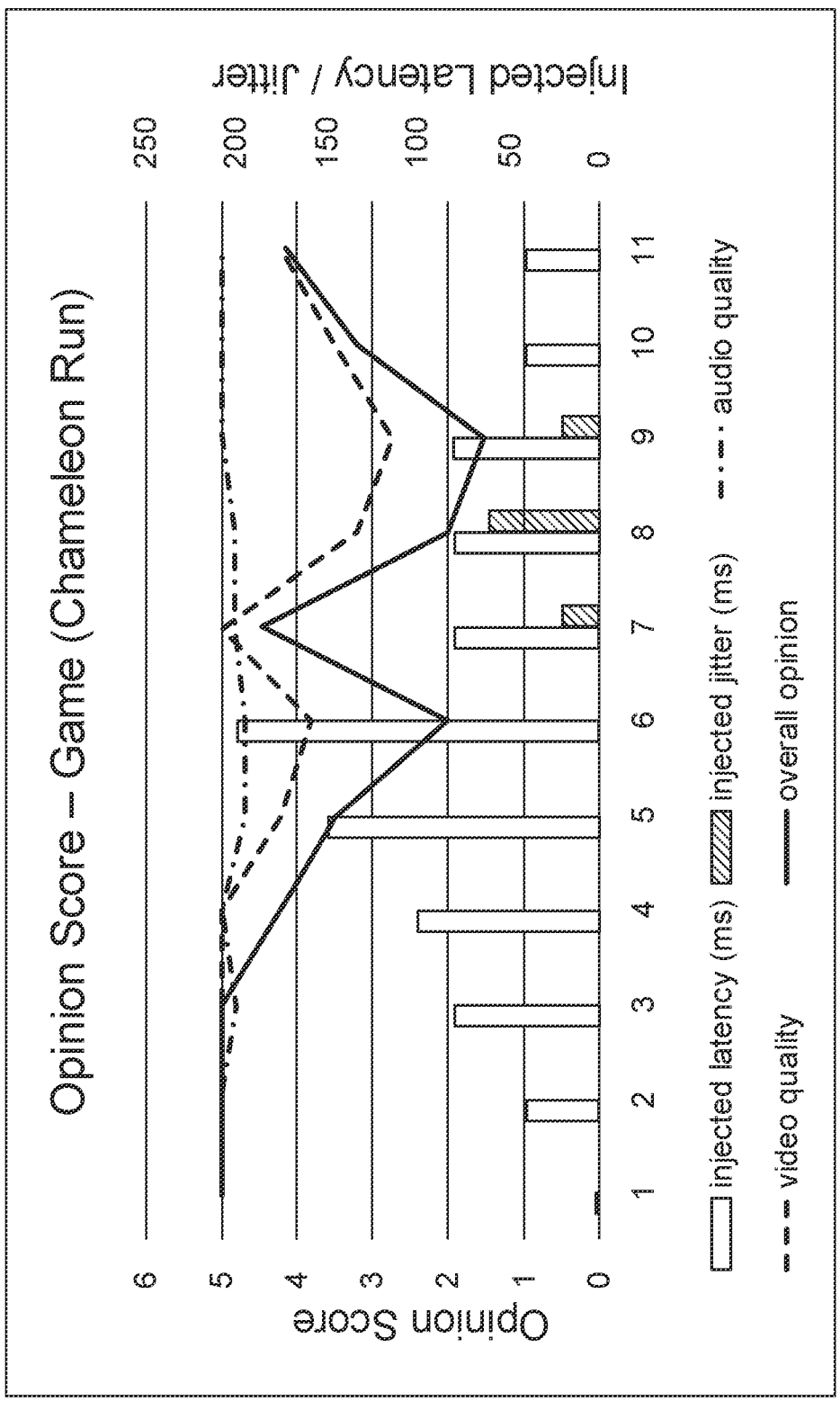
FIG. 5 is an exemplary graph illustrating an impact of jitter on the overall game performance.

Supporting a high throughput per user over the wireless network can have a high impact on the network capacity. The network capacity is a shared pool of resources amongst all Enhanced Mobile Broadband (eMBB) users. It can cause higher network element utilization that has a direct impact on the End-to-end (E2E) latency and/or jitter. For example, FIG. 5 illustrates an impact of jitter on the overall game performance based on testing performed in a lab. The testing involved injecting additional latency and/or jitter and observe its impact on overall game performance such as video quality, audio quality and overall quality. As illustrated in FIG. 5, there is no latency impact up to 80 ms (without jitter) on the overall quality. However, when jitter is injected, the overall game performance is impacted for the same latency values. Thus, most applications have jitter tolerance requirements and discard packets outside of the jitter tolerance range, as it does not help with improved user experience.

In some examples, applications such as XR applications demand high throughput and have stringent jitter and/or latency requirements. By contrast, wireless networks are jittery due to several factors such as congestion, radio conditions, error correction mechanisms, etc. Most XR applications are jitter intolerant, and thus discard packets/frames received outside of a jitter tolerance window. Radio network capacity resources can be scarce at times due to the need to serve a diverse set of ever-growing use cases.

Accordingly, embodiments of the present disclosure are directed to a system and method that can allow, in some examples, for delay-sensitive applications such as XR technologies to work well over various network communication systems. Embodiments of the present disclosure include a method that can be implemented in systems such as base stations before the data is transmitted through the network. This method determines delays in various layers of the base station and if the predicted jitter and/or latency for the data packet are not less than the identified jitter or latency requirements from a network, then the data packet is dropped and not transmitted through the network. It should be understood that the embodiments can be implemented in any system and network service for any application. A data packet can be referred to as an IP packet or an IP data packet. In one example, an IP packet can carry data (bits/bytes) over transmission medium and can have a header portion that contains information to help find its way to the destination and to reassemble the data at the destination.

An advantage of the embodiments of the present disclosure includes enhancing the network capability by determining the jitter and/or latency requirements, determining whether the packets would cause jitter and/or latency, and responding to the jitter and/or latency before the data packet is transmitted. This can provide a seamless experience for users and help discard packets in the system if the packets do not meet the set application requirements. This allows conservation of network resources and/or network capacity. If the system does not discard the packets that do not meet the set application requirements, then the application on the user end may discard the packet at the expense of wasting network resources. In one example, selectively deciding when to transmit packets/frames, especially XR data that fall outside the XR application tolerable window over the air interface, may increase the capacity of wireless networks and avoid unnecessary congestion.

Turning to FIG. 1, FIG. 1 is a diagram of an environment 100 that can be used to perform the network capacity enhancement method, according to embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory, as further described with reference to FIG. 5.

Environment 100 is an example of a suitable architecture for implementing certain aspects of the present disclosure. In one embodiment, environment 100 includes, among other components not shown, a network capacity enhancement system 102 and a user equipment 106. Each of the network capacity enhancement system 102 and user equipment 106 shown in FIG. 1 can comprise one or more computer devices, such as the computing device 400 of FIG. 5 discussed below. In one example, the network capacity enhancement system 102 may be embodied at least partially by the instructions corresponding to user equipment 106. Therefore, the network capacity enhancement system 102 can operate on a server or on a user device, such as user equipment 106, or partially on multiple devices. As shown in FIG. 1, the network capacity enhancement system 102, the user equipment 106, and the application 120 can communicate via a network 108, which may include, without limitation, one or more local area networks (LANs) and/or wide area networks (WANs). Such networking environments are commonplace in offices, enterprise-wide computer networks, intranets, and the Internet. It should be understood that any number of user devices and network capacity enhancement systems may be employed within environment 200 within the scope of the present disclosure. Each may comprise a single device or multiple devices cooperating in a distributed environment. For instance, the network capacity enhancement system 102 could be provided by multiple devices collectively providing the functionality of the network capacity enhancement system 102 as described herein. Additionally, other components not shown may also be included within the network environment.

It should be understood that any number of user devices 106, network capacity enhancement system 102, and other components can be employed within the operating environment 100 within the scope of the present disclosure. Each can comprise a single device or multiple devices cooperating in a distributed environment.

User device 106 can be any type of computing device capable of being operated by a user. For example, in some implementations, user equipment 106 is the type of computing device described in relation to FIG. 5. By way of example and not limitation, a user equipment 106 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user equipment 106 can include one or more processors and one or more computer-readable media. The computer-readable media may include computer-readable instructions executable by the one or more processors. The instructions may be embodied by one or more applications.

The system 100 can include an application 120 such as an XR application that sends data through the network to the user equipment 106. Application 120 is referred to as a single application for simplicity, but its functionality can be embodied by one or more applications in practice.

The application(s) may generally be any application capable of facilitating performance of data transmission through unused channels (e.g., via the exchange of information between the user devices and the network capacity enhancement system 102). In some implementations, the application(s) comprises a web application, which can run in a web browser, and could be hosted at least partially on the server-side of environment 100. In addition, or instead, the application(s) can comprise a dedicated application, such as an application having image-processing functionality. In some cases, the application is integrated into the operating system (e.g., as a service). It is therefore contemplated herein that "application" be interpreted broadly.

In accordance with embodiments herein, the application 120 or user equipment 106 can either initiate the network capacity enhancement system 102 to facilitate network capacity enhancement method via a set of operations.

In embodiments, the network capacity enhancement system 102 identifies delay requirements of the service application. Delay requirements can include jitter and/or latency requirements. For example, the network capacity enhancement system 102 can identify jitter tolerance range of a service application such as an XR service platform. The service application can be any system. In one example, the network capacity enhancement system 102 identifies delay requirements of the service application by requesting and receiving the information from the service application. In one example, the delay requirements can be obtained from an application provider or a content provider. In another example, network capacity enhancement system 102 identifies delay requirements of the service application by recognizing the delay requirements of the service application based on past experience. In another example, the network capacity enhancement system identifies the delay requirements of the service application when it receives the information from the service application. It should be understood that the network capacity enhancement system 102 can use any method to identify the delay requirements of the network service.

The network capacity enhancement system 102 uses a layer such as a Packet Data Convergence Protocol (PDCP) to calculate the predicted jitter and/or latency of a data packet. The predicted jitter and/or latency can include the jitter delay and/or the latency delay. If the predicted jitter and/or latency for the data packet is not less than the identified delay requirements of the network service, then the network capacity enhancement system 102 can drop the packet. If the PDCP layer determines that the predicted jitter and/or latency for the data packet is less than the identified delay requirements of the network service, then the network capacity enhancement system 102 uses another layer such as a Media Access Control (MAC) layer to calculate the predicted jitter and/or latency based on any additional expected delay accounting such as MAC scheduling queue, User Equipment (UE) Channel Quality Indication (CQI), and Hybrid Automatic Repeat Request (HARQ) retransmissions, or the like. If the MAC layer determines that the predicted jitter and/or latency for the data packet is less than the identified delay requirements, it prepares the data to be transmitted through the network. If the MAC layer determines that the predicted jitter and/or latency for the data packet is not less than the identified delay requirement, then the data packet is dropped. When a data packet is dropped, it could be retransmitted at a later time or may not be transmitted at all.

For cloud-based implementations, the instructions on network capacity enhancement system 102 may implement one or more aspects of the network capacity enhancement system 102, and application 120 may be utilized by a user and/or system to interface with the functionality implemented on the server(s). In some cases, application 120 comprises a web browser. In other cases, network capacity enhancement system 102 may not be required. For example, the functionality described in relation to the network capacity enhancement system 102 can be implemented completely on a user device, such as user equipment 106.

These components may be in addition to other components that provide further additional functions beyond the features described herein. The network capacity enhancement system 102 can be implemented using one or more devices, one or more platforms with corresponding application programming interfaces, cloud infrastructure, and the like. While the network capacity enhancement system 102 is shown separate from the user equipment 106 in the configuration of FIG. 1, it should be understood that in other configurations, some or all of the functions of the network capacity enhancement system 102 can be provided on the user equipment 106.

Figure 2A:
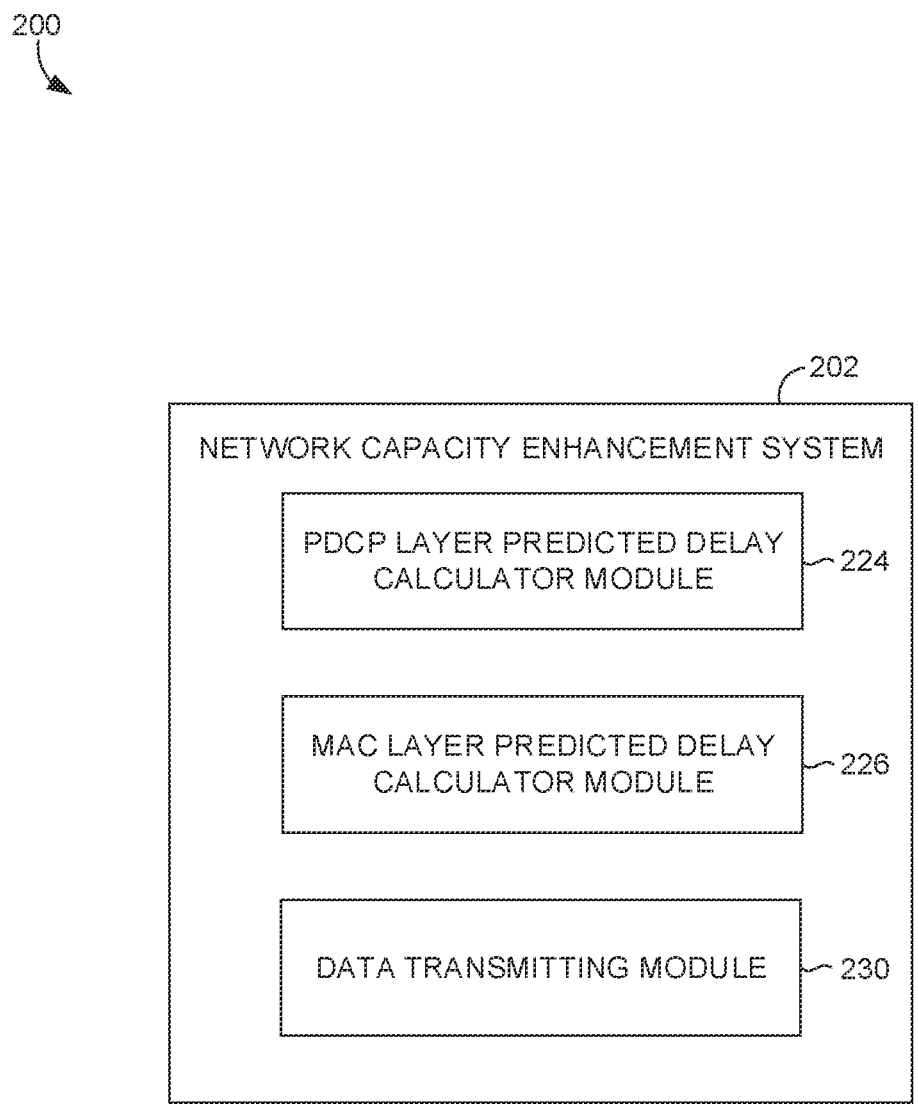
FIG. 2A provides an exemplary network capacity enhancement system, in accordance with embodiments described herein.

Turning to FIG. 2A, FIG. 2A provides an exemplary network capacity enhancement system 202. As shown, an exemplary network capacity enhancement system 102 includes a PDCP Layer Predicted Jitter and/or latency Calculator Module 224, a MAC Layer Predicted Jitter and/or latency Calculator Module 226, and a Data Transmitting Module 230. As can be appreciated, any number of components may be used to perform the various functionalities described herein.

In accordance with some aspects of the operating environment 200, the PDCP Layer Predicted Jitter and/or latency Calculator Module 224 determines the jitter and/or latency of a data packet. The Calculator Module 224 determines jitter or latency or both.

In accordance with some aspects of operating environment 200, the Mac Layer Predicted Jitter and/or latency Calculator Module 226 determines the jitter and/or latency of the data packet in the MAC layer.

In accordance with some aspects of the operating environment 200, the data transmitting module 230 is configured to transmit the data packet. The data transmitting module 230 can transmit the data packet to another system, a User Equipment (UE), another service, another application, or the like.

Figure 2B:
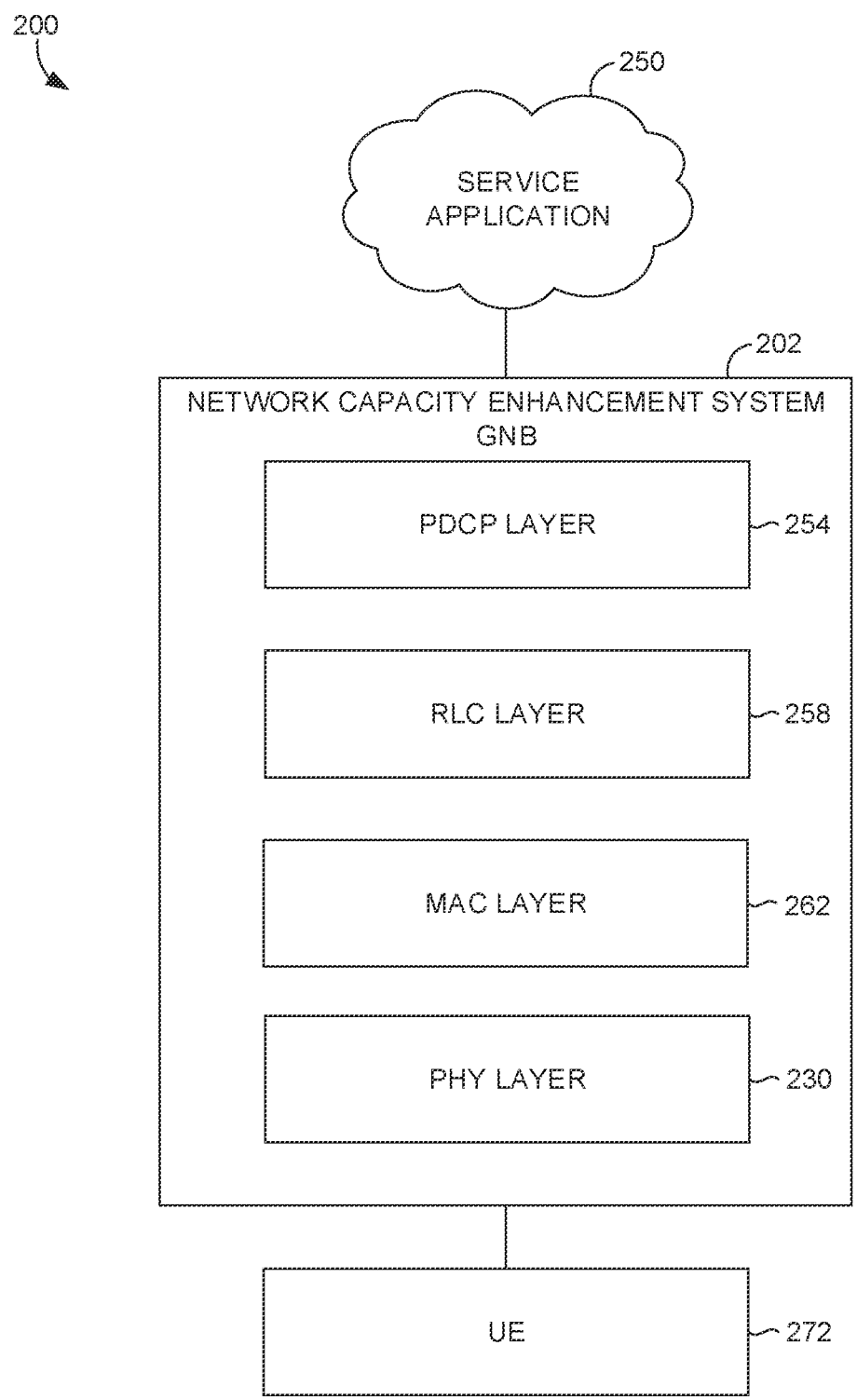
FIG. 2B provides another exemplary network capacity enhancement system, in accordance with embodiments described herein.

Turning to FIG. 2B, FIG. 2B provides an exemplary application of the network capacity enhancement system 202. In one embodiment, the network capacity system 202 can receive data from a service application 250. The service application 250 can be an application that needs to transmit data through the network. For example, the service application 250 can be an XR application or any other service or system that needs to transmit data.

The network capacity enhancement system 202 can be a Next Generation Node B (gNB). A gNB is a node in a cellular network that provides connectivity between a User Equipment (UE) 272 and an external service such as an application service 250. In one example, the gNB provides wireless connectivity to the UE. The application running on the UE can communicate to its server via a cellular network that involves UE, gNB, and core network. In one example, a gNB can be a base station in a cellular network. It should be understood that the network capacity enhancement system 202 can be any system that can calculate delays and transmit data through the network.

An exemplary gNB node can include a PDCP layer 254. The PDCP layer 254 is a Packet Data Convergence Control layer. In some embodiments, the PDCP layer 254 is used as a packet data bearer and can include other functions such as decryption, duplicate removal, and the like, among other things. An exemplary gNB node can also include a Radio Link Control (RLC) layer 258. In some embodiments, the RLC layer 258 is responsible for segmentation and reassembly, among other things. An exemplary gNB node can also include a Medium Access Control (MAC) layer 262. In some embodiments, the MAC layer 262 can determine channel access methods for transmission, among other things. In some embodiments, the Physical (PHY) layer 266 provides the physical and electrical interface of the gNB system, among other things.

Figure 3:
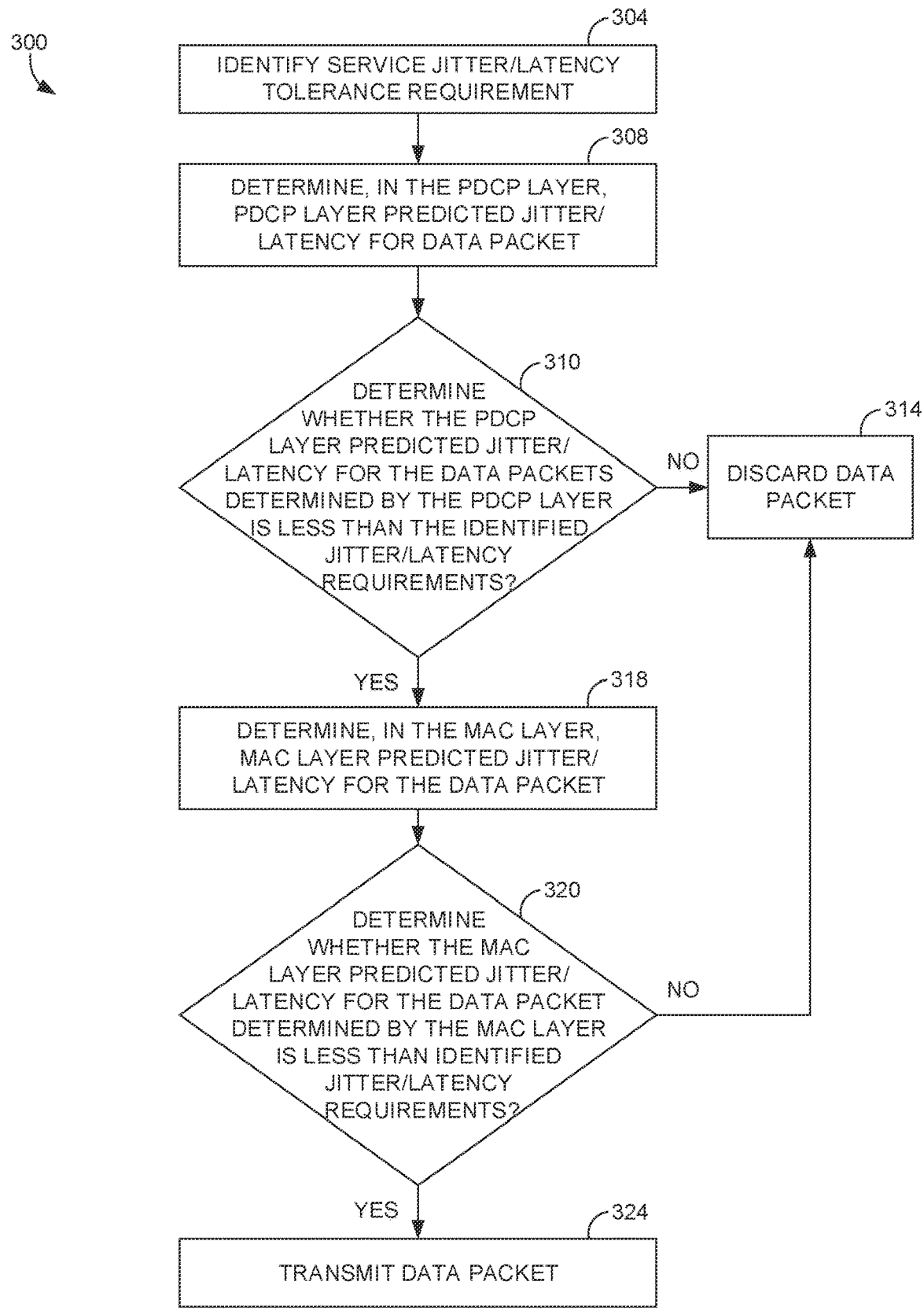
FIG. 3 is a flow diagram illustrating an exemplary method for implementing the network capacity enhancement in accordance with one embodiment of the present disclosure.

With reference to FIG. 3, FIG. 3 is a flow diagram illustrating an exemplary method 300 for facilitating network capacity enhancement in accordance with one embodiment of the present disclosure. A processing device such as a user device, a server, a cloud computing service, or the like implements the exemplary method 300. The network capacity enhancement system can initiate the network capacity enhancement method 300 as described herein.

As shown in FIG. 3, in one embodiment, at block 304, a network capacity enhancement system identifies delay requirements of the service application such as jitter and/or latency tolerance requirements of the service application. In one example, the network capacity system identifies the jitter and/or latency requirement when it is shared by the service application. For example, XR applications residing in the cloud provide jitter requirements to the XR as a service (XRaaS) platform, which in turn shares these jitter requirements for specific Application IDs and/or IP addresses to the network elements. It should be understood that any other method can be used to identify the jitter and/or latency requirements of the service application. The network capacity enhancement system, at block 308, determines in the PDCP layer 254 the predicted jitter and/or latency for the data packets. These data packets are received by the system and provided to the PDCP layer 254. In one example, the PDCP layer 254 calculates the packet delay based on the time stamp of the IP packet. In one example, the data packets or traffic from the service application can be tagged with a marker, with all the data packets having the marker representing data packets from the service application. The time stamps of these data packets can be identified to determine the predicted delays such as predicted jitter and/or latency In one example, the PDCP layer 254 calculates the packet delay based on the time stamp of the IP packet to avoid unnecessary packets being sent to one or more of the RLC, the MAC, or the PHY layers if the packets exceed jitter requirements at the PDCP layer. This can preserve the system resources of the lower layers. In other embodiments, one or more of any layers can calculate the packet delay. In one example, only specific data packets from the XR application can be considered for the calculation of latency and jitter.

The network capacity enhancement system, at block 310, determines whether the predicted jitter and/or latency for the data packet determined by the PDCP layer 254 is less than the identified jitter and/or latency requirements of the service application. If the predicted jitter and/or latency for the data packet is not less than the identified jitter and/or latency requirements, then the data packet is dropped at block 314. In one example, the network capacity enhancement system accounts for historic statistics to compare timestamps of a previous data packet(s) to determine jitter and/or latency of current packets at the PDCP layer 254. In one example, determining jitter and/or latency of current packets at the PDCP layer 254 can include one or more of determining a time stamp for one or more previous data packets, determining transmission speed of one or more previous data packets, and adding the time stamp to the transmission speed to determine the one or more of the jitter or the latency in the PDCP layer for the current data packet.

If the predicted jitter and/or latency for the data packet is less than the identified jitter and/or latency requirements, then at block 318, the MAC layer 262 determines the predicted jitter and/or latency of the data packet. The MAC layer 262 calculates the predicted jitter and/or latency based on the time stamp of the IP packet and also accounts for additional delays due to MAC scheduling queue, UE CQI, HARQ retransmission, or the like. In one example, the network capacity enhancement system accounts for historic statistics to compare timestamps of a previous data packet(s) to determine jitter and/or latency of current packets at the MAC layer 262. In one example, the predicted jitter and/or latency of the data packet determined in the MAC layer 262 can be different than the jitter and/or latency of the data packet determined in the PDCP layer 254. In another example, the predicted jitter and/or latency of the data packet determined in the MAC layer 262 can account for one or more of the PDCP, RLC, and PHY layers channel conditions as well. In one example, determining jitter and/or latency of current packets at the MAC layer 262 can include one or more of determining a time stamp for one or more previous data packets, identifying any additional delays, determining transmission speed of one or more previous data packets, and adding the time stamp and the identified additional delays to the transmission speed to determine the one or more of the jitter or the latency in the PDCP layer for the current data packet. In one example, the identified additional delays can be associated with any additional delays associated with the network, with the different layers (PDCP, RLC, PHY, MAC, or the like), with the data packets, or with the UE or any application connected to the XR, UE, network capacity enhancement system, or network.

The network capacity enhancement system, at block 320, determines whether the predicted jitter and/or latency for the data packet determined by the MAC layer 262 is less than the identified jitter and/or latency requirements of the service application. If the total expected delay turns out to be greater than the required jitter, the packet is dropped prior to MAC scheduling. If the predicted jitter and/or latency for the data packet is not less than the identified jitter and/or latency requirements, then the data packet is dropped at block 314.

If the predicted jitter and/or latency for the data packet is less than the identified jitter and/or latency requirements, then at block 324, the network capacity enhancement system transmits the data packet. For example, the data packet is transmitted through the network to a UE.

Figure 4:
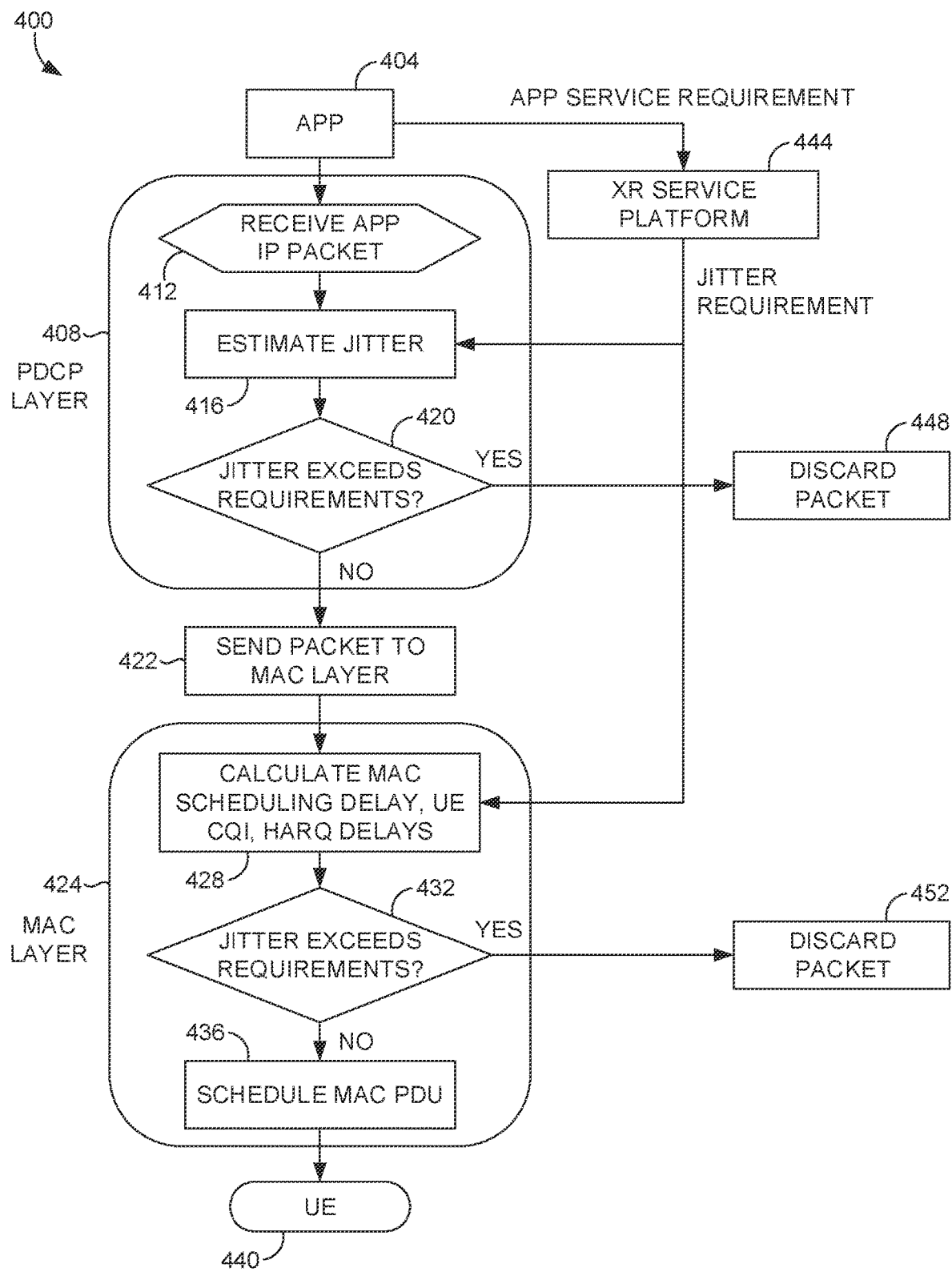
FIG. 4 is a flow diagram illustrating another exemplary method for implementing the network capacity enhancement in accordance with one embodiment of the present disclosure.

With reference to FIG. 4, FIG. 4 is a flow diagram illustrating another exemplary method 400 for facilitating network capacity enhancement in accordance with one embodiment of the present disclosure. A processing device such as a user device, a server, a cloud computing service or the like implements the exemplary method 400. The network capacity enhancement system can initiate the network capacity enhancement method 400 as described herein.

The network capacity enhancement system, at block 412, receives a data packet from a service application 404. In one example, the service application 404 can be an XR application. The data packet can be received in the PDCP layer 408 of the network capacity enhancement system. It should be understood that any other layer or module in the network capacity enhancement system can receive the data packet from the service application 404.

The network capacity enhancement system, at block 444, identifies the jitter and/or latency requirement for the service application 404. At block 416, the network capacity enhancement system determines the jitter for the data packet based on the jitter requirement identified from the service application 404 at block 444.

The network capacity enhancement system, at block 420, determines whether the determined jitter and/or latency is less than the identified jitter and/or latency requirement for the service application 404. If the determined jitter and/or latency is not less than the identified jitter and/or latency requirement for the service application, then the data packet is dropped at block 448. If the determined jitter and/or latency is less than the identified jitter and/or latency requirement for the service application, then the data packet is sent to the MAC layer 424 at block 422.

The network capacity enhancement system, at block 428, in the MAC layer 424, calculates additional delays such as MAC scheduling delay, UE CQI, HARQ delays, and the like. The network capacity enhancement system then determines the predicted jitter and/or latency based on the additional delays based on the identified jitter/latency requirements of the service application from block 444.

At block 432, the network capacity enhancement system determines whether the determined jitter and/or latency is less than the identified jitter and/or latency requirement for the service application. If the determined jitter and/or latency is not less than the identified jitter and/or latency requirement for the service application, then the data packet is dropped at block 452. If the determined jitter and/or latency is less than the identified jitter and/or latency requirement for the service application, then the MAC Protocol Data Unit (PDU) is scheduled at block 436. The MAC PDU are packages of data, which is sent to the PHY layer for further transmission. In some embodiments, a MAC PDU is a message changed between the MAC entities in a communication system.

The data packet, at block 440, is transmitted to the UE. In one example, blocks 412, 416, and 420 occur in the PDCP layer, and block 428, 432, and 436 occur in the MAC layer. It should be understood that any combination of these blocks can occur in any layer or one layer, or the like, of the network capacity enhancement system.

Figure 6:
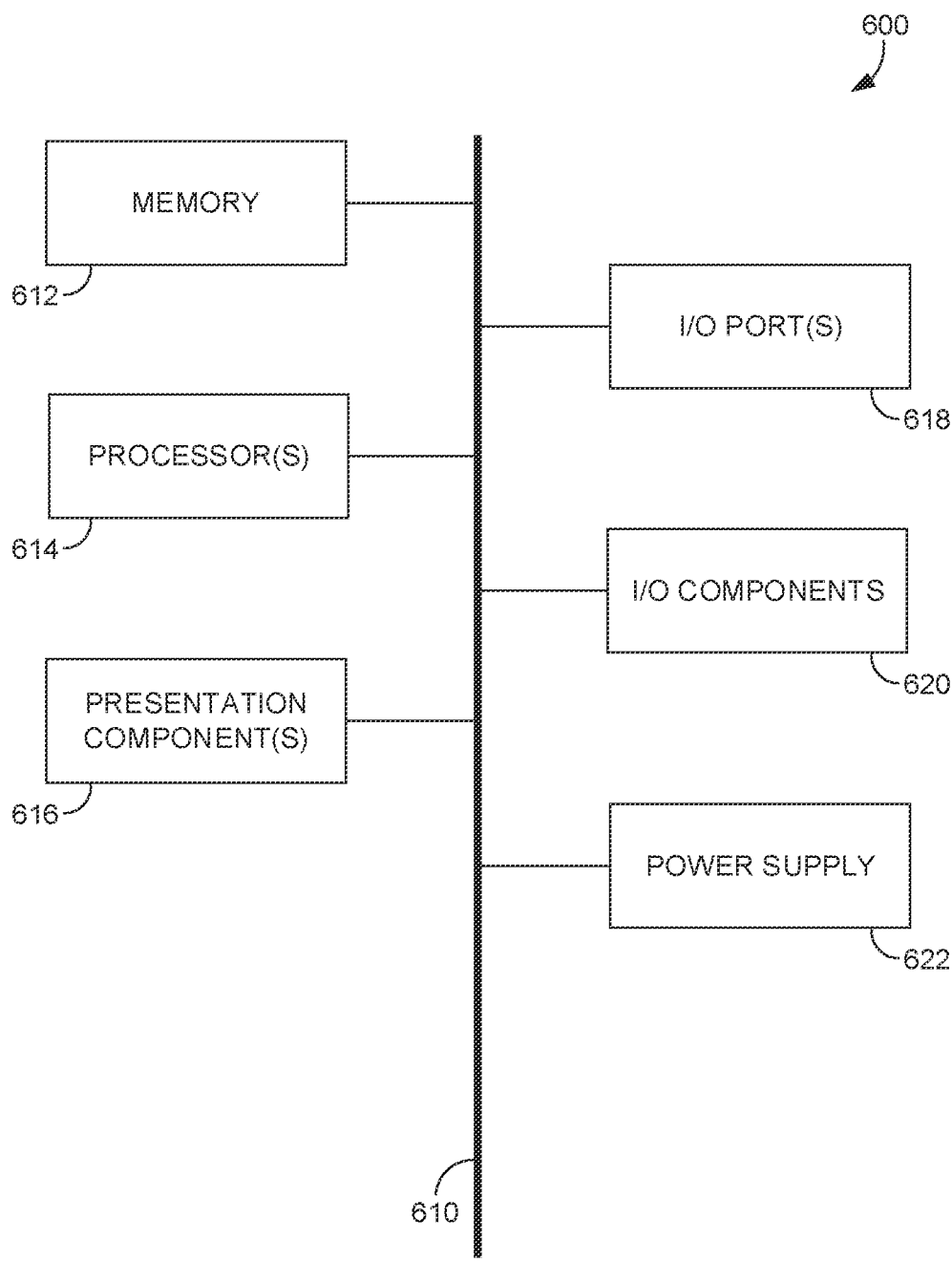
FIG. 6 is an exemplary operating environment for implementing embodiments of the present technology.

Having described implementations of the present disclosure, an exemplary operating environment in which embodiments of the present technology may be implemented is described below in order to provide a general context for various aspects of the present disclosure. Referring to FIG. 6, an exemplary operating environment for implementing embodiments of the present technology is shown and designated generally as computing device 400. Computing device 400 is but one example of a suitable computing environment and is not intended to suggest any limitation as to the scope of use or functionality of the technology described herein, and neither should the computing device 400 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The technology described herein may be practiced in a variety of system configurations, including handheld devices, consumer electronics, general purpose computers, more specialty computing devices, etc. The technology described herein may also be practiced in distributed computing environments where tasks are performed by remote processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 6 and refer to "computing device."

Computing device 600 typically includes a variety of computer-readable media. Computer-readable media can be any available media that can be accessed by computing device 600 and includes both volatile and nonvolatile media, removable and non-removable media. By way of example and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs), or other optical disk storage, magnetic cassettes, magnetic tape, magnetic disk storage or other magnetic storage devices, or any other medium that can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical disc drives, etc. Computing device 600 includes one or more processors that read data from various entities such as memory 612 or I/O components 620. Presentation component(s) 616 present data indications to a user and/or system or other device. Exemplary presentation components include a display device, speaker, printing component, vibrating component, etc.

I/O ports 618 allow computing device 600 to be logically coupled to other devices including I/O components 620, some of which may be built-in. Illustrative components include a microphone, joystick, game pad, satellite dish, scanner, printer, wireless device, etc. The I/O components 620 may provide a natural user and/or system interface (NUI) that processes air gestures, voice, or other physiological inputs generated by a user and/or system. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these for gesture detection and recognition. Additionally, the computing device 600 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" as facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment, however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well-adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for network capacity enhancement, the method comprising:
   identifying delay requirements for an Extended Reality (XR) service application;
   predicting, in a Packet Data Convergence Protocol (PDCP) layer, one or more of jitter or latency for a data packet;
   determining, in the PDCP layer, whether the one or more of the jitter or the latency for the data packet in the PDCP layer are less than the delay requirements identified for the XR service application;
   if the predicted one or more of the jitter or the latency in the PDCP layer is less than the delay requirements identified for the XR service application, dropping the data packet;
   if the predicted one or more of the jitter or the latency in the PDCP layer is higher than the delay requirements identified for the XR service application,
   sending the data packet to a Media Access Control (MAC) layer,
   predicting, in the MAC layer, the one or more of the jitter or the latency for the data packet,
   if the predicted one or more of the jitter or the latency in the MAC layer is less than the delay requirements identified for the XR service application, discarding the data packet; and
   if the predicted one or more of the jitter or the latency in the MAC layer is higher than the delay requirements identified for the XR service application, scheduling resources for transmission of the data packet over a physical layer.

2. The method of claim 1, further comprising:
   receiving the data packet from the XR service application.

3. The method of claim 1, wherein the predicting of the one or more of the jitter or latency in the PDCP layer for the data packet further comprises:
   determining a time stamp for a previous data packet;
   determining transmission speed of the previous data packet; and
   adding the time stamp to the transmission speed to predict the one or more of the jitter or the latency in the PDCP layer for the data packet.

4. The method of claim 1, wherein the predicting of the one or more of the jitter or the latency in the MAC layer for the data packet further comprises:
   determining a time stamp for a previous data packet;
   identifying additional delays;
   determining transmission speed of the previous data packet; and
   adding the time stamp to the transmission speed and the additional delays to determine the one or more of the jitter or the latency in the MAC layer for the data packet.

5. The method of claim 4, wherein the additional delays include one or more of a MAC scheduling queue, a User Equipment (UE) Channel Quality Indication (CQI), and a Hybrid Automatic Repeat Request (HARQ) retransmission.

6. The method of claim 3, wherein the data packet from the XR service application is marked and the marked data packet is used to determine the time stamp.

7. The method of claim 4, wherein a marker is attached to the data packet from the XR service application.

8. The method of claim 7, wherein the marked data packet is used to determine the time stamp.

9. The method of claim 1, further comprising:
   transmitting the data packet to a user equipment.

10. The one or more non-transitory computer-readable media having a plurality of executable instructions embodied thereon, which, when executed by one or more processors, cause the one or more processors to perform a method for network capacity enhancement, the method comprising:
    identifying delay requirements for a XR service application;
    predicting, in a PDCP layer, one or more jitter or latency for a data packet;
    determining, in the PDCP layer, whether the one or more of the jitter or the latency for the data packet in the PDCP layer are less than the delay requirements identified for the XR service application;
    if the predicted one or more of the jitter or the latency in the PDCP layer is less than the delay requirements identified for the XR service application, dropping the data packet;
    if the predicted one or more of the jitter or the latency in the PDCP layer is higher than the delay requirements identified for the XR service application,
    sending the data packet to a Media Access Control (MAC) layer,
    predicting, in the MAC layer, one or more of the jitter or the latency for the data packet,
    if the predicted one or more of the jitter or the latency in the MAC layer is less than the delay requirements identified for the XR service application, discarding the data packet;
    if the predicted one or more of the jitter or the latency in the MAC layer is higher than the delay requirements identified for the XR service application, scheduling resources for transmission of the data packet over a physical layer.

11. The one or more non-transitory computer-readable media of claim 10, further comprising:
    receiving the data packet from the XR service application.

12. The one or more non-transitory computer-readable media of claim 10, wherein the predicting of the one or more of the jitter and the latency in the PDCP layer for the data packet further comprises:
    determining a time stamp for a previous data packet;
    determining transmission speed of the previous data packet; and
    adding the time stamp to the transmission speed to determine the one or more of the jitter or the latency in the PDCP layer for the data packet.

13. The one or more non-transitory computer-readable media of claim 10, wherein the predicting of the one or more of the jitter or the latency in the MAC layer for the data packet further comprises:

determining a time stamp for the previous data packet;
identifying additional delays;
determining transmission speed of the previous data packet; and
adding the time stamp to the transmission speed and the additional delays to determine the one or more of the jitter or the latency in the MAC layer for the data packet.

14. The one or more non-transitory computer-readable media of claim 13, wherein the additional delays include one or more of a MAC scheduling queue, a UE CQI, and a HARQ retransmission.

15. The one or more non-transitory computer-readable media of claim 12, wherein a marker is attached to the data packet from the XR service application.

16. The one or more non-transitory computer-readable media of claim 15, wherein the marked data packet is used to determine the time stamp.

17. The one or more non-transitory computer-readable media of claim 10, further comprising:
transmitting the data packet to a user equipment.

18. A computing system comprising:
one or more processors; and
one or more non-transitory computer-readable storage media, coupled with the one or more processors, having instructions stored thereon, which, when executed by the one or more processors, cause the computing system to:
identify delay requirements for an XR service application;
predict in a PDCP layer, one or more of jitter or latency for a data packet;
determine, in the PDCP layer, whether the one or more of the jitter or the latency for the data packet is less than the delay requirements identified for the XR service application;
if the predicted one or more of the jitter or the latency in the PDCP layer is less than the delay requirements identified for the XR service application, drop the data packet;
if the predicted one or more of the jitter or the latency in the PDCP layer is higher than the delay requirements identified for the XR service application,
send the data packet to a Media Access Control (MAC) layer,
predict, in the MAC layer, the one or more of the jitter or the latency for the data packet,
if the predicted one or more of the jitter or the latency in the MAC layer is less than the delay requirements identified for the XR service application, discard the data packet;
if the predicted one or more of the jitter or the latency in the MAC layer is higher than the delay requirements identified for the XR service application, schedule resources for transmission of the data packet over a physical layer.

19. The computing system of claim 18, wherein the prediction of the one or more of the jitter or latency in the PDCP layer for the data packet further comprises:
determining a time stamp for the previous data packet;
determining transmission speed of the previous data packet; and
adding the time stamp to the transmission speed to predict the one or more of the jitter or latency in the PDCP layer for the data packet.

20. The computing system of claim 18, wherein the prediction of the one or more of the jitter or the latency in the MAC layer for the data packet further comprises:
determining a time stamp for a previous data packet;
identifying additional delays;
determining transmission speed of the previous data packet; and
adding the time stamp to the transmission speed and the additional delays to determine the one or more of the jitter or the latency in the MAC layer for the data packet.

* * * * *